Patented Sept. 16, 1952

2,610,925

UNITED STATES PATENT OFFICE 2,610,925

RUBBER RECLAIMING OIL

Fred W. Staten, Laramie, Wyo., assignor to the United States of America as represented by the Secretary of the Interior No Drawing. Application June 14, 1950, Serial No. 168,140

5 Claims. (Cl. 106—316)

(Granted under the act of March 3, 1883, as amended April 30, 1928; 370 O. G. 757)

The invention herein described and claimed may be manufactured and used by or for the Government of the United States of America for governmental purposes without the payment of royalties thereon or therefor.

This invention relates to the reclaiming of natural and synthetic rubber scrap and is concerned particularly with a reclaiming oil containing ingredients derived from crude shale oil and with a process for the preparation of these ingredients therefrom.

In the reclaiming of vulcanized natural and synthetic rubber scrap, the ground scrap is usually heated in the presence of a reclaiming oil containing plasticizing and peptizing agents at an elevated temperature and for a sufficient time to reduce the scrap to a condition wherein it can be remilled and otherwise reworked and refabricated. The reclaiming of vulcanized natural rubber scrap has been carried on for years in this manner. With the comparatively recent advent of the synthetic rubbers, for example, the butadiene 1-3 polymers, and copolymers thereof with compounds such as styrene and acrylonitrile, new problems in reclaiming were encountered since the usual reclaiming oils for reclaiming vulcanized natural rubber were relatively ineffective in reclaiming the synthetics. A number of new plasticizing and peptizing agents have been proposed for use with the synthetics, and among these which have proved to be most successful are di(hydroxyaryl)sulfides prepared for example from cresylic acid by interaction thereof with sulfur chloride. The di(hydroxyaryl)sulfides are ordinarily used in conjunction with other softening agents such as aromatic or pine oil solvents and carboxylic acids such as abietic acid (rosin oil) or the higher fatty acids such as lauric or stearic, and such compositions have proven to be very satisfactory in reclaiming of rubber scrap containing vulcanized natural rubber and a large percentage or even 100% of synthetic rubber.

It has now been found that a reclaiming oil suitable for reclaiming both natural and synthetic rubber scrap may be prepared from the crude oil obtained by the destructive distillation of oil shale. It has been found that by the alkaline extraction of a fraction of this crude oil boiling between 300° to 650° F. there may be very readily and inexpensively obtained a mixture of phenols highly suitable for conversion into di-(hydroxyaryl)sulfides having excellent peptizing properties and that from this same crude oil fraction there may be also obtained a mixture of carboxylic acids having excellent softening properties for rubber scrap. In admixture, the di(hydroxyaryl)sulfides and the mixture of carboxylic acids form the basic ingredients of a reclaiming oil which is at the same time highly effective and inexpensively obtained from cheap raw materials.

In accordance with the invention, a distillation fraction boiling between 300° to 650° F. of a crude oil obtained by the destructive distillation of oil shale is extracted with a strong alkaline solution. The alkaline extract is then acidified thereby freeing a mixture of phenols and likewise a mixture of carboxylic acids which are present therein. The phenols are then converted to di(hydroxyaryl)sulfides, for instance, by interaction of the phenols with sulfur chloride, and a mixture is formed of the carboxylic acids and the di(hydroxyaryl)sulfides thus produced.

The reclaiming oil may be prepared, according to a simple procedure, by recovering both the phenols and the carboxylic acids from the alkaline extract in one step by acidifying the extract to a pH below 5. In this way, a mixture of phenols and carboxylic acids is obtained. This mixture may be then subjected to the action of an agent such as sulfur monochloride ($S_2Cl_2$) for converting the phenols into di(hydroxyaryl)sulfides thus forming a mixture of di(hydroxyaryl)-sulfides and the shale oil carboxylic acids of the invention without prior separation of the phenols from the carboxylic acid mixture.

While the preparation of the reclaiming oil may be carried out as described above without separately recovering the phenols and the mixture of carboxylic acids from the alkaline extract, it is very desirable to make the separate recovery, and the invention, accordingly, will be described particularly in reference to a process involving the separate recovery of these two ingredients.

The starting point in the preparation of the reclaiming oil of the present invention is a crude oil obtained by the destructive distillation of oil shale at temperatures ranging from 700° F. to 1400° F. In conformity with usage in the United States, the term "oil shale" in the specification and claims is intended to refer to all sedimentary rocks containing kerogen, regardless of their common or scientific designations, which upon destructive distillation yield a mixture of hydrocarbons and certain nitrogen and phenolic compounds, usually called "shale oil." Extensive deposits of oil shale are found in this country, particularly in Colorado, Utah, and Wyoming and deposits of varying extent and richness are found in other countries throughout the world. The crude oils obtained by destructive distillation of domestic oil shales particularly of the type found in Colorado, Wyoming, and Utah, are especially useful in connection with the present invention.

The art of retorting oil shale is well known and need not be described in detail. Retorting temperatures generally run from 900° F. to 1300° F. All of the crude retort oil thus obtained is not suitable for the purposes of the invention, but it has been found that a fraction boiling between 300° F. to 650° F. contains a combination of ingredients, not found in petroleum or coal tar oils, from which an excellent reclaiming oil may be very inexpensively prepared. In general, fractions boiling in the lower portion of this range, most desirably from 320° F. to 500° F., contain phenolic compounds most suitable for conversion into di(hydroxyaryl)sulfides of excellent peptizing properties for natural and synthetic rubbers, while fractions boiling in the upper portion of this range, preferably from 400° F. to 625° F. contain mixtures of carboxylic acids having the most desirable softening properties for rubber.

A selected fraction of the crude shale oil distilling in the range stated above, is treated with a strong alkaline solution to extract the acidic materials present in the crude oil. Preferably, a strong aqueous caustic solution, such as a 10% aqueous NaOH solution is employed, using standard caustic treaters such as are used in the coal tar and petroleum industry. The extraction, however, may be carried out in any desired manner so as to recover the major portion of the phenols and the carboxylic acids present in the crude shale oil fraction. To separately recover the phenols and the carboxylic acids, the alkaline extract is first acidified to a pH between 7 and 10 using carbon dioxide or a strong mineral acid such as sulfuric. This causes the phenols to separate as a layer. After this layer is withdrawn, the alkaline extract is further acidified to a pH below 5 using a strong mineral acid. This releases the carboxylic acids which usually separate as a layer or which may be separated from the aqueous phase by extraction with a solvent.

While the percentage varies with different types of crude shale oil, the percentage by weight of total phenols from a crude shale oil fraction boiling between 300° F. and 650° F. is in the neighborhood of 3 or 4%. These phenols consist almost entirely of monohydric phenols of predominantly low molecular weight, such as phenol itself, the cresols, and the xylenols. Also present is a comparatively small percentage of the higher boiling phenols. Although the total yield of phenols may be converted into di(hydroxyaryl)sulfides for use in a reclaiming oil, it is preferable to separate from the total yield of phenols by vacuum distillation for example, a cresylic acid fraction which is then converted into cresylic disulfides which are generally most effective as reclaiming agents. Cresylic acid is predominantly a mixture of the isomeric cresols containing also xylenols, and is made in various distillation ranges. A typical cresylic acid, for example, consists of such a mixture with 50% boiling between 204 to 206° C. at 760 mm. Hg.

The total yield of phenols or a preferred cresylic acid fraction, may be converted into di(hydroxyaryl)sulfides in any desired manner. One convenient method is by the reaction of the phenols with sulfur monochloride ($S_2Cl_2$) in known manner. The phenols may by this method be converted into monosulfides, disulfides, or polysulfides, the disulfides and polysulfides being preferred. Typical individual compounds obtained by reaction of the phenols obtained from crude shale oil as described with sulfur monochloride, for example, are: dicresyl monosulfide, dicresyl disulfide, dicresyl polysulfide, dihydroxy phenyl monosulfide, dihydroxy phenyl disulfide, bis(dimethyl-hydroxyphenyl)disulfide, hydroxyphenyl cresyl monosulfide, hydroxyphenyl(dimethylhydroxy phenyl)disulfide, cresyl (dimethyl hydroxyphenyl)disulfide, and similar combinations wherein the two hydroxyaryl groups may be the same or different. If the total yield of phenolics obtained from the crude oil contains an appreciable quantity of high molecular weight phenols, it is preferable to remove such phenols because of the unfavorable solubility and poor flow characteristics of the sulfides which may be made from them.

After recovery of the phenols from the alkaline extract at a pH above 7, the extract is then acidified to a pH below 5 using a strong mineral acid to recover the mixture of carboxylic acids present therein. The yield of carboxylic acids from the crude shale oil will differ depending upon the particular crude oil utilized, but generally the yield runs from about .2% to about .7% by weight from a crude fraction boiling between 300 and 650° F. The carboxylic acids thus obtained are a mixture of acids containing from about 6 to 15 carbon atoms per molecule. Carbon to hydrogen ratios and silica gel separations indicate a composition of about half saturated acids and half unsaturated acids. Indices of refraction indicate the presence of some naphthenic-type acids. Since this mixture of acids is quite complex it is very difficult to determine its exact composition. It is believed however that its excellent properties for softening rubber are due to some extent at least to the presence of unsaturation and of the naphthenic-type acids, it being understood however that the invention does not depend upon this theory.

The di(hydroxyaryl)sulfides and the mixture of carboxylic acids obtained as described above may be mixed in any desired proportions to form a reclaiming oil of excellent properties. Preferably, the carboxylic acids comprise no less than 20% and no more than 70% by weight of the mixture based on the weight of these two ingredients alone. Usually it is very desirable to incorporate a quantity of an organic solvent such as solvent naphtha or toluene to assist the swelling of the rubber and to allow the penetration of the reclaiming agents. Optionally, auxiliary softeners such as asphalt, pine oil, or resin acids such as abietic may also be incorporated.

Although the mixture of carboxylic acids obtained in accordance with the invention is most advantageously used in conjunction with the di(hydroxyaryl)sulfides obtained by conversion of the phenols present in the same crude oil fraction to provide an inexpensive reclaiming oil of excellent properties, if desired, these acids may be used in admixture with di(hydroxyaryl)sulfides obtained from other sources, or in conjunction with other peptizing agents suitable for reclaiming natural or synthetic rubbers. For example, the carboxylic acid mixture of the invention may be used in conjunction with the mercaptan-type peptizer, particularly the aryl mercaptans such as thiophenol, thioalkylated phenols, such as the thiocresols and thioxylenols, and the thionaphthols. In addition to its use as a softener in conjunction with peptizers in the reclaiming of natural and synthetic rubber scrap, the carboxylic acid mixture of the invention will find application wherever an effective rubber-softening agent is desired.

The reclaiming oil of the invention, containing a peptizing agent, most desirably di(hydroxyaryl) sulfides obtained by conversion of the phenols present in the shale oil, and the mixture of carboxylic acids, likewise obtained, as an auxiliary softening agent, will find uses in the reclaiming of a variety of vulcanized natural and synthetic rubbers. In addition to vulcanized natural rubber, synthetic rubbers, particularly the polymers of butadienes 1-3 and the copolymers of butadienes 1-3 with compounds containing a $CH_2=C<$ group such as styrene or acrylonitrile may be successfully reclaimed using the reclaiming agents of the invention. Similarly, mixtures of vulcanized natural rubber and synthetic rubber may also be reclaimed. Copolymers of butadiene 1-3 and styrene (GRS rubber), copolymers of butadiene 1-3 and acrylonitrile (GRA rubber) and mixtures thereof with other synthetics or natural rubber are examples of the type of rubber scrap that may be successfully reclaimed using the reclaiming agents of the invention.

The reclaiming oils of the invention are to be used in connection with the usual "digester" or "heater" process, for reclaiming rubber scrap. According to the "digester" process, the ground rubber scrap, reclaiming oils, water, and if necessary, a cellulose dissolving substance such as zinc chloride or sodium hydroxide, is charged into a steam jacketed autoclave and cooked at a temperature of from about 300° to 425° F. for a sufficient time to plasticize and devulcanize the rubber scrap. After the cook is completed, the kettle charge is blown down and the rubber washed free of cellulose or other fibers, and the reclaiming chemicals. The rubber is then dried and is ready to be compounded on the batching mill and to be refabricated. The pan, or "heater" process is similar to the "digester" process except that small amounts of water are used. Ordinarily this process is used when handling rubbers containing little cellulose fibers or fabric. According to this process the ground scrap is placed in pans with the usual reclaiming oils and swelling agents and the substantially dry or slightly moistened scrap heated in a steam autoclave until the rubber is plasticized. In the heater process, the reclaiming takes place at approximately the same temperature as in the "digester" process, namely from about 300° to 425° F. The amount of reclaiming oil required depends upon the type of rubber scrap to be reclaimed. In general, the synthetics are more difficult to reclaim than the vulcanized natural rubbers and require a greater quantity of the reclaiming oil. Using the reclaiming oil of the invention containing in admixture di(hydroxyaryl) sulfides and a mixture of carboxylic acids obtained in accordance with the invention, a vulcanized natural scrap will require from about 0.1% to 1% of the reclaiming oil based on the weight of the scrap to be reclaimed, while synthetic rubbers such as a copolymer of butadiene 1-3 with styrene (GRS rubber) may require up to about 6% by weight of the reclaiming oil, although ordinarily about 1 to 4 percent should be sufficient. In reclaiming a mixture of natural and synthetic rubber, in general, the higher the percentage of the synthetic, the larger amount of reclaiming oil is required.

Example 1

The following example illustrates the preparation of a reclaiming oil from an N-T-U crude shale oil prepared from Colorado shale yielding an average of 30 gallons of crude oil per ton of shale obtained from the Bureau of Mines Experimental oil-shale mine in the vicinity of Rifle, Colorado. In accordance with the so-called N-T-U retorting process, a cylindrical retort is filled with crushed shale. The shale at the top of the retort is then ignited and air is blown downwardly through the bed of shale. Heat furnished by combustion of the upper layer of shale serves to decompose the kerogen in the layers of shale beneath the combustion zone. The oil vapors which distill from the shale are carried out of the retort in the hot air stream. The combustion zone advances downwardly through the complete charge in the cylindrical retort, residual carbon in the shale from which the oil has already been driven supporting combustion and furnishing heat throughout the retorting process. Distillation temperatures are in the neighborhood of from 850° to 1000° F.

From a crude shale oil thus prepared, a fraction distilling between 320° to 500° F. was obtained. This fraction was treated with a 10% aqueous NaOH solution in a standard caustic treater and the caustic extract thus obtained was then stream stripped to remove impurities. The sodium phenolates present in this solution were sprung by the addition of sulphuric acid to a pH of 7.6. The phenols separated as a layer and were withdrawn. About 3.5% by weight of total phenolics were obtained in this manner from the original crude oil fraction.

The phenols were stripped of water and then separated into fractions by vacuum distillation and a cresylic acid fraction obtained, boiling between 385° F. and 432° F. at 760 mm. Hg, in a yield amounting to about 2% based on the weight of the original crude oil fraction. This cresylic acid fraction was reacted with sulphur monochloride ($S_2Cl_2$). The reaction was carried out in carbon tetrachloride as solvent at the temperature of boiling carbon tetrachloride (170° F.). The cresylic acid was dissolved in the $CCl_4$ and the $S_2Cl_2$ added dropwise while the solution refluxed. Two moles of cresylic acid were reacted with one mole of $S_2Cl_2$. After about one hour solvent $CCl_4$ was distilled off leaving cresyl disulfide as the product.

The caustic solution remaining after the removal of the phenols was then made acid to pH 3.0 and a layer of carboxylic acids formed and was separated from the aqueous phase. Acid number determinations of the mixture of carboxylic acids thus obtained indicated about 8 to 10 carbon atoms per molecule. Other analyses showed a composition of about half saturated and half unsaturated acids and the presence of some naphthenic-type acids.

A reclaiming oil was prepared by combining the di(hydroxyaryl) sulfides and the mixture of carboxylic acids obtained as described above in the following proportions:

| | G. |
|---|---|
| Di(hydroxyaryl) sulfide | 50.0 |
| Shale oil carboxylic acids | 25.0 |
| Toluene | 10.0 |

Example 2

A tire tread scrap containing 20% of natural vulcanized rubber and 80% of GRS rubber (a copolymer of butadiene 1-3 with styrene) was charged to a steam jacketed autoclave together with reclaiming ingredients in the following proportions:

| | Parts |
|---|---|
| Ground scrap | 100 |
| Water | 100 |
| Zinc chloride (granulated) | 4 |
| Reclaiming oil prepared in accordance with Example 1 | 2 |
| Solvent naphtha | 3 |

The above was cooked at a temperature of about 390° F. for 5 hours. The plasticized scrap was then washed and dried. After this treatment, the rubber scrap could be easily milled on the usual batching and compounding mill and could be sheeted out and after proper compounding reformed and revulcanized.

Example 3

A tire tread scrap containing 100% GRS rubber (a copolymer of butadiene 1-3 with styrene) was charged to a steam-jacketed autoclave together with reclaiming ingredients in the following proportions:

| | Parts |
|---|---|
| Ground scrap | 100 |
| Water | 100 |
| Zinc chloride (granulated) | 4 |
| Reclaiming oil prepared in accordance with Example 1 | 3 |
| Solvent naphtha | 3 |

After cooking at a temperature of about 390° F. for 5 hours, the plasticized scrap was washed and dried and could be easily milled, compounded and formed into useful objects.

Example 4

A tire tread scrap consisting of 100% natural rubber was charged to a steam-jacketed autoclave together with reclaiming ingredients in the following proportions:

| | Parts |
|---|---|
| Ground scrap | 100 |
| Water | 100 |
| Zinc chloride (granulated) | 3 |
| Reclaiming oil prepared as in Example 1 | 1 |
| Solvent naphtha | 3 |

As in the above examples, the charge was cooked for 5 hours at 390° F., then washed and dried. After this treatment the scrap could be easily milled, refabricated and revulcanized.

Example 5

A tire tread scrap containing a mixture of 50% natural rubber and 50% GRS rubber was reclaimed under the same conditions, using the same reclaiming ingredients in the same proportions as in Example 2. The reclaim obtained could be successfully reworked and refabricated into useful products.

One of the main advantages of the invention resides in the low cost of the reclaiming oils prepared in accordance therewith. Both the phenols for conversion into di(hydroxyaryl)sulfides and the carboxylic acid mixtures may be obtained as cheap by-products of crude shale oil in large quantities by relatively simple processing steps. The alkali extraction is a necessary step in the production of gasoline and diesel fuels from the crude oil fraction utilized; thus the only additional step ordinarily required is the recovery of the phenols and carboxylic acids and the subsequent conversion of the phenols to di(hydroxyaryl) sulfides.

It is to be understood that the above description and examples are for the purpose of illustrating the invention and that the invention is not to be limited thereby, nor in any way, except by the scope of the appended claims.

I claim:

1. A rubber reclaiming oil comprising a mixture of di(hydroxyaryl)-sulfides in combination with a mixture of carboxylic acids, these ingredients being prepared from a distillation fraction boiling between 300° and 650° F. of a crude oil produced by the destructive distillation of oil shale by extracting said fraction with a strong alkaline solution, acidifying said alkaline extract to recover the phenolic acids and carboxylic acids present therein, and converting said phenolic acids to di(hydroxyaryl)-sulfides, said reclaiming oil containing no less than 20% and no more than 70% by weight of carboxylic acids based on the weight of said di(hydroxyaryl)-sulfides and said carboxylic acids alone.

2. A rubber reclaiming oil comprising a mixture of di(hydroxyaryl)-sulfides in combination with a mixture of carboxylic acids, these ingredients being prepared from a distillation fraction boiling between 300° and 650° F. of a crude oil produced by the destructive distillation of oil shale by extracting said fraction with a strong alkaline solution, acidifying said alkaline extract to a pH between 7 and 10 to separately recover the phenolic acids therefrom, converting said separately recovered phenolic acids to di(hydroxyaryl)-sulfides and further acidifying said alkaline extract to a pH below 5 to recover said mixture of carboxylic acids, said reclaiming oil containing no less than 20% and no more than 70% by weight of carboxylic acids based on the weight of said di(hydroxyaryl)-sulfides and said carboxylic acids alone.

3. A rubber reclaiming oil comprising a mixture of di(hydroxyaryl)-sulfides in combination with a mixture of carboxylic acids, said ingredients being prepared from a distillation fraction boiling between 300° and 650° F. of a crude oil produced by the destructive distillation of oil shale, said reclaiming oil containing no less than 20% and no more than 70% by weight of carboxylic acids based on the weight of said di(hydroxyaryl)-sulfides and said carboxylic acids alone.

4. A rubber reclaiming oil comprising a mixture of carboxylic acids in combination with other reclaiming agents selected from the group consisting of di(hydroxyaryl)-sulfides and aryl mercaptans, said mixture of carboxylic acids being prepared from a distillation fraction boiling between 300° and 650° F. of a crude oil produced by the destructive distillation of oil shale, said reclaiming oil containing no less than 20% and no more than 70% by weight of carboxylic acids based on the weight of said di(hydroxyaryl)-sulfides and said carboxylic acids alone.

5. A rubber reclaiming oil comprising a mixture of carboxylic acids in combination with other reclaiming agents selected from the group consisting of di(hydroxyaryl)-sulfides and aryl mercaptans, said mixture of carboxylic acids being prepared from a distillation fraction boiling between 300° and 650° F. of a crude oil produced by the destructive distillation of oil shale by extracting said fraction with a strong alkaline solution, and then acidifying said extract to a pH below 5 to recover said mixture of carboxylic acids, said reclaiming oil containing no less than 20% and no more than 70% by weight of carboxylic acids based on the weight of said di(hydroxyaryl)-sulfides and said carboxylic acids alone.

FRED W. STATEN.

REFERENCES CITED

The following references are of record in the file of this patent:

UNITED STATES PATENTS

| Number | Name | Date |
| --- | --- | --- |
| 2,343,553 | Kirby et al. | Mar. 7, 1944 |
| 2,359,122 | Kirby et al. | Sept. 26, 1944 |
| 2,423,033 | Le Beau | June 24, 1947 |